United States Patent
Kiyama

(10) Patent No.: US 8,466,937 B2
(45) Date of Patent: Jun. 18, 2013

(54) LIGHT SCANNING APPARATUS AND IMAGE FORMING APPARATUS

(75) Inventor: Kota Kiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 13/194,614

(22) Filed: Jul. 29, 2011

(65) Prior Publication Data

US 2012/0033025 A1    Feb. 9, 2012

(30) Foreign Application Priority Data

Aug. 5, 2010    (JP) .................................. 2010-175946

(51) Int. Cl.
 *B41J 2/44* (2006.01)
 *G02B 26/10* (2006.01)

(52) U.S. Cl.
 USPC ........... 347/132; 347/134; 347/237; 347/243; 347/247; 347/260; 347/261

(58) Field of Classification Search
 USPC ................. 347/134, 224, 225, 235, 237, 243, 347/247, 250, 259, 260, 261
 See application file for complete search history.

(56) References Cited

U.S. PATENT DOCUMENTS

| | | | |
|---|---|---|---|
| 5,138,479 A | 8/1992 | Ando | 359/216 |
| 7,224,378 B2 * | 5/2007 | Maeda | 347/235 |
| 8,259,145 B2 * | 9/2012 | Chino et al. | 347/234 |
| 2009/0303561 A1 | 12/2009 | Kiyama | 359/198.1 |
| 2010/0295917 A1 | 11/2010 | Chino et al. | 347/224 |

FOREIGN PATENT DOCUMENTS

| | | |
|---|---|---|
| JP | H03-110512 | 5/1991 |
| JP | H10-148773 | 6/1998 |
| JP | 2009-294542 | * 12/2009 |

* cited by examiner

*Primary Examiner* — Huan Tran

(74) *Attorney, Agent, or Firm* — Fitzpatrick, Cella, Harper & Scinto

(57) ABSTRACT

A light scanning apparatus including: a light source to emit a laser beam; a light source driving unit to turn on and off the light source according to image data and a pixel clock; a rotary polygon mirror to deflect the light beam; a motor to rotationally drive the rotary polygon mirror; and a control unit to control a rotary speed of the motor to generate an acceleration control signal for accelerating the rotary speed and a deceleration control signal for decelerating the rotary speed, wherein for the acceleration control signal, the driving unit corrects the frequency of the pixel clock to be higher than the frequency, which is before the acceleration control, and for the deceleration control signal, the driving unit corrects the frequency of the pixel clock to be lower than the frequency, which is before the deceleration control.

14 Claims, 13 Drawing Sheets

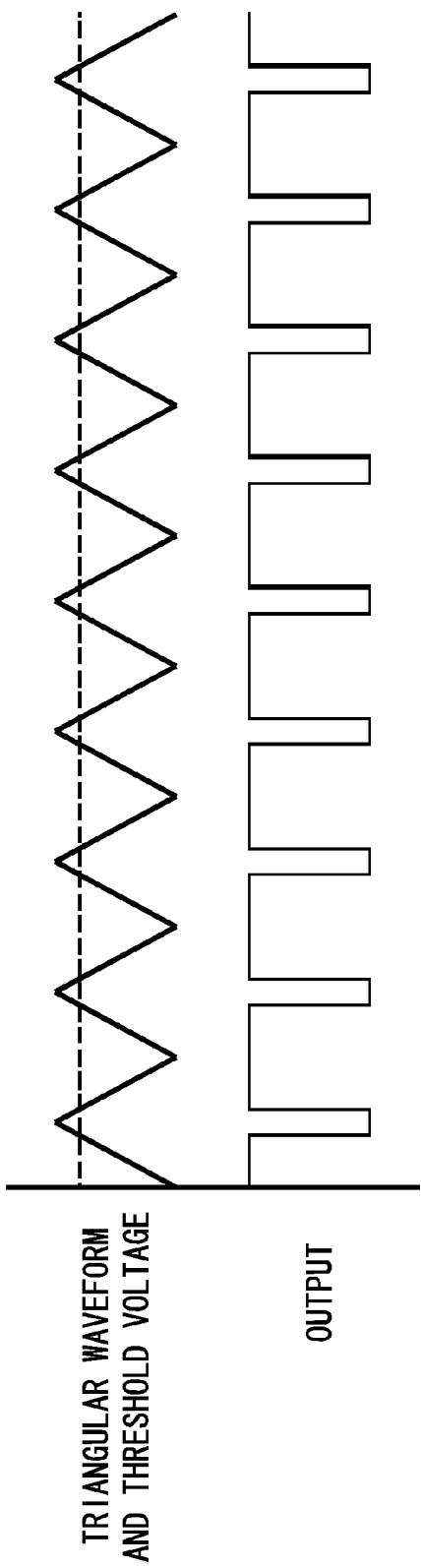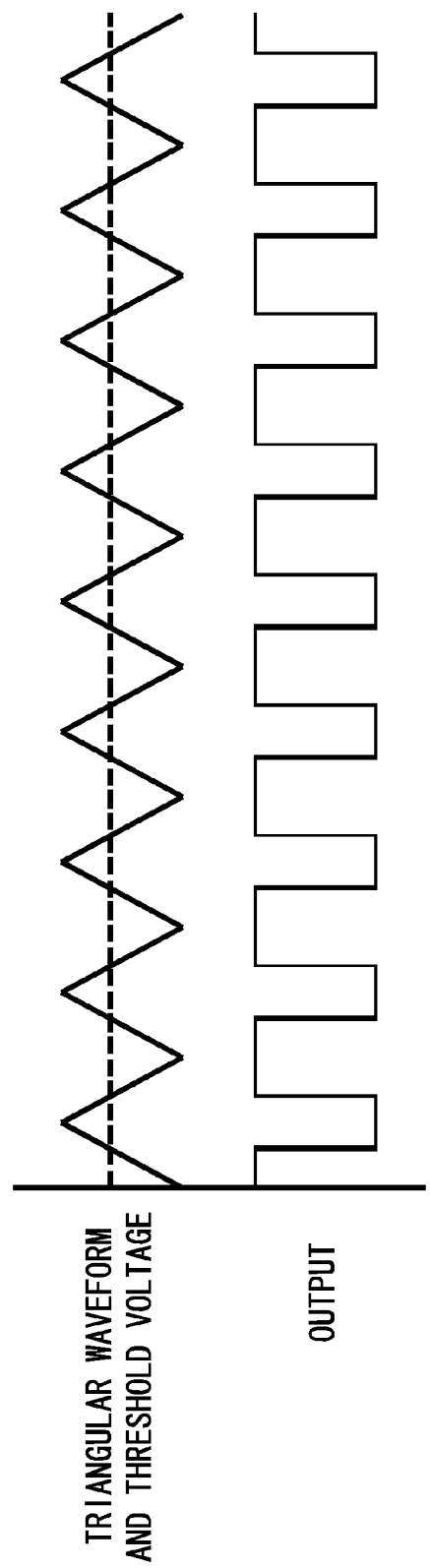

LIGHT SCANNING APPARATUS AND IMAGE FORMING APPARATUS

BACKGROUND OF THE INVENTION

1. Field of the Invention

The present invention relates to a light scanning apparatus for deflecting a laser beam so that the laser beam scans a photosensitive member, and an image forming apparatus having the light scanning apparatus.

2. Description of the Related Art

In recent years, digital copying machines and digital printers have rapidly become widespread, and various types of image forming apparatus have been put into practical use.

A so-called laser beam printer, which is one image forming apparatus using an electrophotographic process, modulates a laser beam output from a semiconductor laser according to an image signal and deflects the laser beam by a rotary polygon mirror. The laser beam deflected by the rotary polygon mirror scans a photosensitive member of a photosensitive drum or the like. When the laser beam scans the photosensitive drum, an electrostatic latent image is formed on the photosensitive drum. The latent image is developed into a toner image by a developing device. The toner image on the photosensitive drum is transferred onto a sheet via an intermediate transfer member, such as an intermediate transfer belt. The transferred toner image on the sheet is then fixed by heat treatment. In this way, the image formation is performed.

Now, a light scanning apparatus (a laser beam scanning system) of a laser beam printer will be described. FIG. 14 illustrates the schematic structure of the laser beam scanning system of the laser beam printer.

The laser beam scanning system of the laser beam printer includes a semiconductor laser 1 for emitting a laser beam as a light beam, a rotary polygon mirror 3, and an fθ lens 4, and forms an electrostatic latent image on a photosensitive drum 5 by emitting the laser beam to the photosensitive drum 5 from the semiconductor laser according to image data. A laser beam LB emitted from the semiconductor laser 1 passes through a cylindrical lens 2 to reach the rotary polygon mirror 3. The rotary polygon mirror 3 is rotationally driven by a driving motor (not shown). The semiconductor laser 1 is supplied with a PWM signal, which has been subjected to pulse width modulation based on an image clock and an image signal, so that the semiconductor laser 1 emits the laser beam LB according to the PWM signal. The laser beam LB having been emitted from the semiconductor laser 1 to reach the rotary polygon mirror 3 is deflected by the rotary polygon mirror 3 and converted by the fθ lens 4 so that a moving speed (scanning speed) of the laser beam on the photosensitive drum may be constant. The laser beam LB therefore scans the surface of the photosensitive drum 5 at a constant speed in the direction indicated by the arrow A of FIG. 14. Part of the laser beam having passed through the fθ lens 4 is reflected by a BD reflecting mirror 6, which is disposed at a position that does not irradiate a region of the photosensitive drum 5 in which an image is to be formed (hereinafter, referred to as an image region). The laser beam is then received by a BD sensor 7. In the image region, the laser beam LB is reflected by a reflecting mirror 8 after passing through the fθ lens 4 and irradiates the photosensitive drum 5. The photosensitive drum 5 is charged by a charging device (not shown), and an electrostatic latent image is thus formed when the photosensitive drum is irradiated with the laser beam LB.

Subsequently, a speed control method for the driving motor in the laser beam scanning system will be described with reference to FIG. 15. FIG. 15 is a block diagram of a control circuit, schematically adding the driving motor 9. The BD reflecting mirror 6 for detecting a BD signal is not illustrated.

Referring to FIG. 15, the BD signal as a main scanning synchronization signal is input to a frequency division circuit 10. The frequency division circuit 10 divides a frequency of the BD signal by a value equal to the number of mirror surfaces of the rotary polygon mirror 3. In FIG. 15, the number of the mirror surfaces is "8".

Meanwhile, the reason why the frequency of the BD signal is divided by the number 8 of the mirror surfaces of the rotary polygon mirror 3 will be briefly described with reference to FIG. 16. The rotary polygon mirror 3 is not a complete regular polygon because of limited manufacturing accuracy. Accordingly, even when the rotation of the driving motor 9 is stable, the cycle of the BD signal fluctuates as indicated by T1 to T8 of FIG. 16. Therefore, if the driving motor 9 is controlled based on this BD signal, appropriate control cannot be performed.

On the other hand, when the frequency of the BD signal is divided by 8 to generate a BD/8 signal, as represented by the waveform of the BD/8 signal of FIG. 16, the BD signal is shaped into a signal having a single pulse for each revolution of the driving motor 9. In this case, if a rotary speed of the driving motor 9 is stable at a target speed, the BD/8 signal is not affected by fluctuations in surface shape of the rotary polygon mirror 3, and the cycle thereof is always constant (Tround). In this way, the rotary cycle of the driving motor 9 can be measured accurately without being affected by the fluctuations in surface shape of the rotary polygon mirror 3. This is the reason why the BD signal is divided by the number of the mirror surfaces of the rotary polygon mirror 3.

Returning to FIG. 15, the BD signal whose frequency has been divided by the frequency division circuit 10 (i.e., BD/8 signal) is input to a counter 11. The counter 11 measures the cycle of the BD/8 signal, that is, the rotary cycle of the driving motor 9.

The count value Tround of the counter 11 and a target cycle Ttarget stored in a target value storing portion 12 are input to a control signal generating portion 13. The control signal generating portion 13 calculates an acceleration control amount and a deceleration control amount of the driving motor 9 based on the count value Tround and the target cycle Ttarget, and generates an ACC signal (acceleration signal) and a DEC signal (deceleration signal). Note that, as the target cycle Ttarget, a target cycle corresponding to the BD/8 signal is set.

A motor driving portion 20 generates a motor driving signal according to the ACC signal and the DEC signal input from the control signal generating portion 13, to thereby rotationally drive the driving motor 9.

In the laser beam printer, the laser beam is scanned as described above to form an electrostatic latent image on the photosensitive drum.

Actually, however, the scanning speed of the laser beam on the photosensitive drum fluctuates a little every scanning, and the formed electrostatic latent image therefore suffers from magnification fluctuations in the laser beam scanning direction, which thus degrades image quality.

One factor causing the fluctuations in scanning speed of the laser beam is fluctuations in rotary speed of the rotary polygon mirror.

As described above, the rotary polygon mirror is under speed control through the measurement of its cycle for every revolution and is accelerated or decelerated even during image formation. The fluctuations in rotary speed are thus present within a control range, resulting in the fluctuations in scanning speed of the laser beam. Such fluctuations are present even if the shape of the rotary polygon mirror is an ideal regular polygon.

To address such fluctuations, Japanese Patent Application Laid-Open No. H10-148773 proposes a method in which the rotary speed of the rotary polygon mirror is detected to correct a write timing of the laser beam based on the result of detection so as to reduce image misregistration caused by the fluctuations in rotary speed of the rotary polygon mirror.

Further, another factor causing the fluctuations in scanning speed of the laser beam is the accuracy of the surface shape of the rotary polygon mirror. The rotary polygon mirror is desired to be an ideal regular polygon, but actually has a manufacturing error. When the mirror surface shows a convex tendency, the scanning speed of the laser beam is slower than that measured when the mirror surface is an ideal flat surface, thus resulting in a small scanning magnification. When the mirror surface shows a concave tendency, the scanning speed of the laser beam is faster, thus resulting in a large scanning magnification. Such fluctuations in scanning speed are present even if the rotary polygon mirror ideally rotates at a constant speed, and periodically occur along with the rotation of the rotary polygon mirror.

A solution to such fluctuations is proposed in Japanese Patent Application Laid-Open No. H03-110512. Japanese Patent Application Laid-Open No. H03-110512 proposes a method in which a scanning magnification of each mirror surface is measured in advance to correct a write timing of the laser beam at the time of scanning on the each mirror surface by utilizing the result of measurement so as to reduce image misregistration caused by the fluctuations in surface shape.

The above-mentioned related art, however, has the following problems.

As described above, in the laser beam scanning system of a laser beam printer, the rotary polygon mirror is accelerated or decelerated even during image formation so as to be controlled to have a rotary speed fall within a given range. In other words, specifically, the rotary speed of the rotary polygon mirror fluctuates with the acceleration or deceleration, with the result that fluctuations in magnification in an electrostatic latent image occur.

The method proposed in Japanese Patent Application Laid-Open No. H10-148773 can eliminate long-period fluctuations in rotary speed of the rotary polygon mirror, but cannot eliminate the above-mentioned short-period fluctuations occurring in association with acceleration or deceleration of the rotary polygon mirror. As described above, the speed control of the rotary polygon mirror is performed by detecting the rotary cycle of the rotary polygon mirror every revolution. However, the fluctuations in scanning speed in association with acceleration or deceleration of the rotary polygon mirror are short-period fluctuations such that the scanning speed varies every scanning made by the rotary polygon mirror.

For example, in Japanese Patent Application Laid-Open No. H10-148773, the rotary speed is detected every revolution of the rotary polygon mirror to correct the write timing, which cannot eliminate the above-mentioned short-period fluctuations, thus resulting in a control error.

Further, in Japanese Patent Application Laid-Open No. H03-110512, in order to eliminate the magnification fluctuations caused by the accuracy of the shape of the rotary polygon mirror, the magnification of each mirror surface is measured in advance to correct the write timing. In Japanese Patent Application Laid-Open No. H03-110512, however, the above-mentioned fluctuations in rotary speed of the rotary polygon mirror occurring in association with the acceleration or deceleration are not taken into consideration. In reality, the magnification fluctuations among the mirror surfaces show a difference between when the rotary polygon mirror is accelerated and decelerated, thus also resulting in a control error.

SUMMARY OF THE INVENTION

The present invention has been made in view of the above-mentioned problems, and it is therefore an object thereof to suppress fluctuations in scanning magnification of a light beam.

In order to solve the above-mentioned problems, a light scanning apparatus according to the present invention includes: a light source configured to emit a light beam; a light source driving unit configured to turn on and off the light source according to image data and a pixel clock; a rotary polygon mirror configured to deflect the light beam emitted from the light source so that the light beam scans a photosensitive member; a motor configured to rotate the rotary polygon mirror; and a control unit configured to generate a signal, including an acceleration control signal and a deceleration control signal, for controlling a rotary speed of the rotary polygon mirror and control the motor based on the signal, wherein in a case in which the control unit generates the acceleration control signal, the light source driving unit corrects the frequency of the pixel clock so as to be higher than the frequency of the pixel clock, which is generated before the control unit controls the motor based on the acceleration control signal, and in a case in which the control unit generates the deceleration control signal, the light source driving unit corrects the frequency of the pixel clock so as to be lower than the frequency of the pixel clock, which is generated before the control unit controls the motor based on the deceleration control signal.

Further, in order to solve the above-mentioned problems, an image forming apparatus according to the present invention includes the above-mentioned light scanning apparatus.

According to the present invention, the fluctuations in scanning magnification of the light beam can be suppressed so as to form a high quality image in which image misregistration is reduced.

Further features of the present invention will become apparent from the following description of exemplary embodiments with reference to the attached drawings.

BRIEF DESCRIPTION OF THE DRAWINGS

FIG. 4 is a diagram illustrating a basic operation of a motor driver.

FIG. 5 is a diagram illustrating the basic operation of the motor driver.

DESCRIPTION OF THE EMBODIMENTS

In the following, exemplary embodiments of the present invention will be described. Note that, the technical scope of the present invention is intended to be determined by the scope of claims and should therefore not be limited by the following individual embodiments.

First Embodiment

Figure 1:
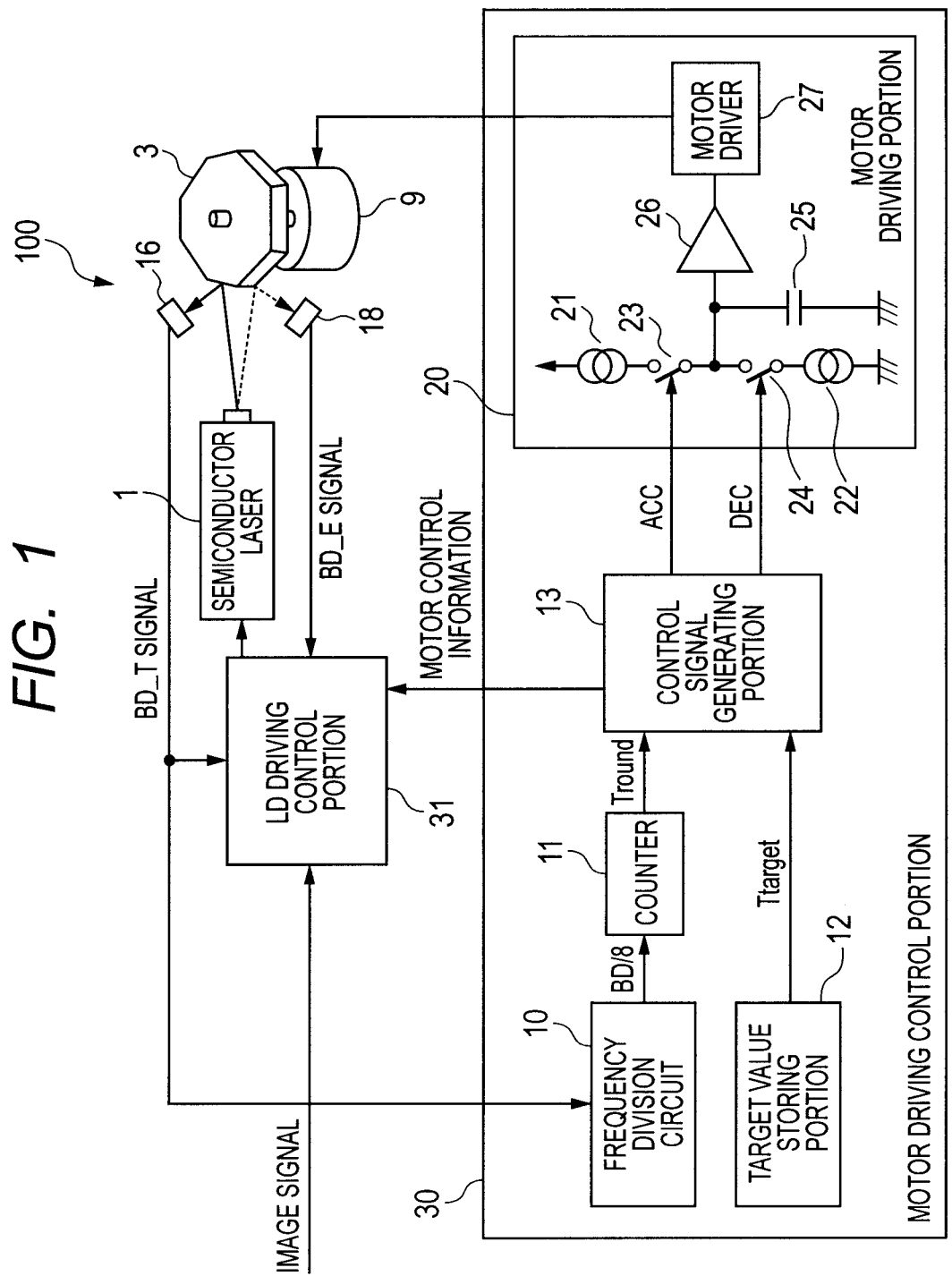
FIG. 1 is a block diagram of a driving motor and a semiconductor laser control circuit provided in a light scanning apparatus according to a first embodiment of the present invention.

FIG. 1 is a diagram illustrating a light scanning apparatus 100 according to a first embodiment of the present invention. The light scanning apparatus 100 is provided in an image forming apparatus including an image forming portion that forms an image on a recording medium by an electrophotographic process.

Figure 2:
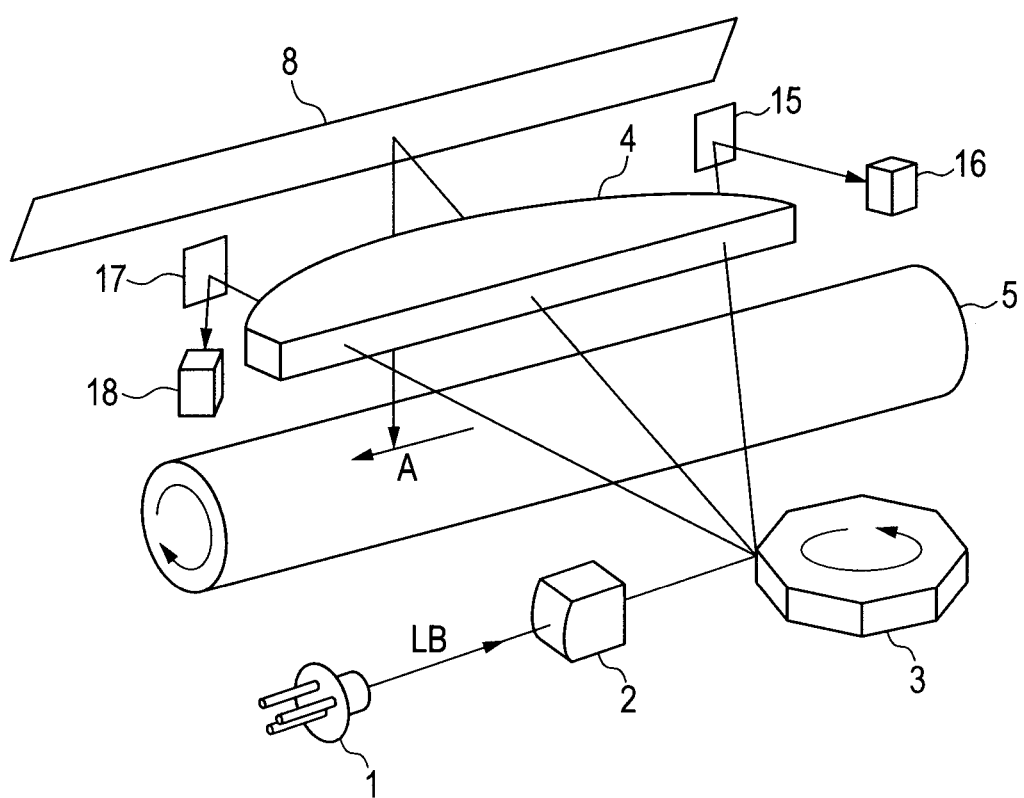
FIG. 2 is a schematic structural diagram illustrating the light scanning apparatus according to the first embodiment.

FIG. 2 illustrates a schematic structure of a light scanning system according to the first embodiment.

Figure 14:
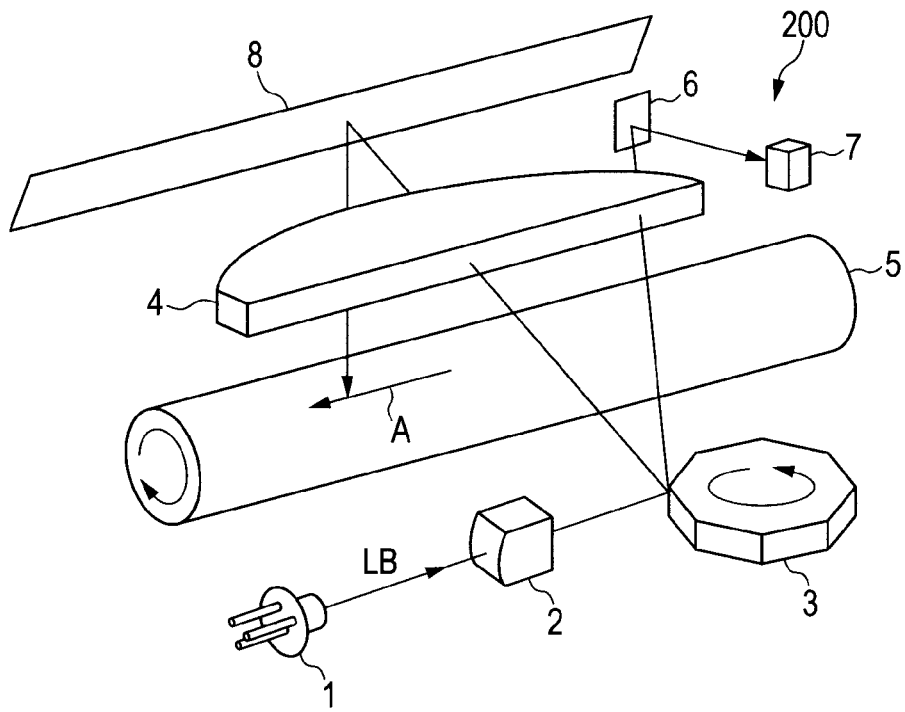
FIG. 14 is a diagram illustrating a schematic structure of a laser beam scanning system of a laser beam printer.
Figure 15:
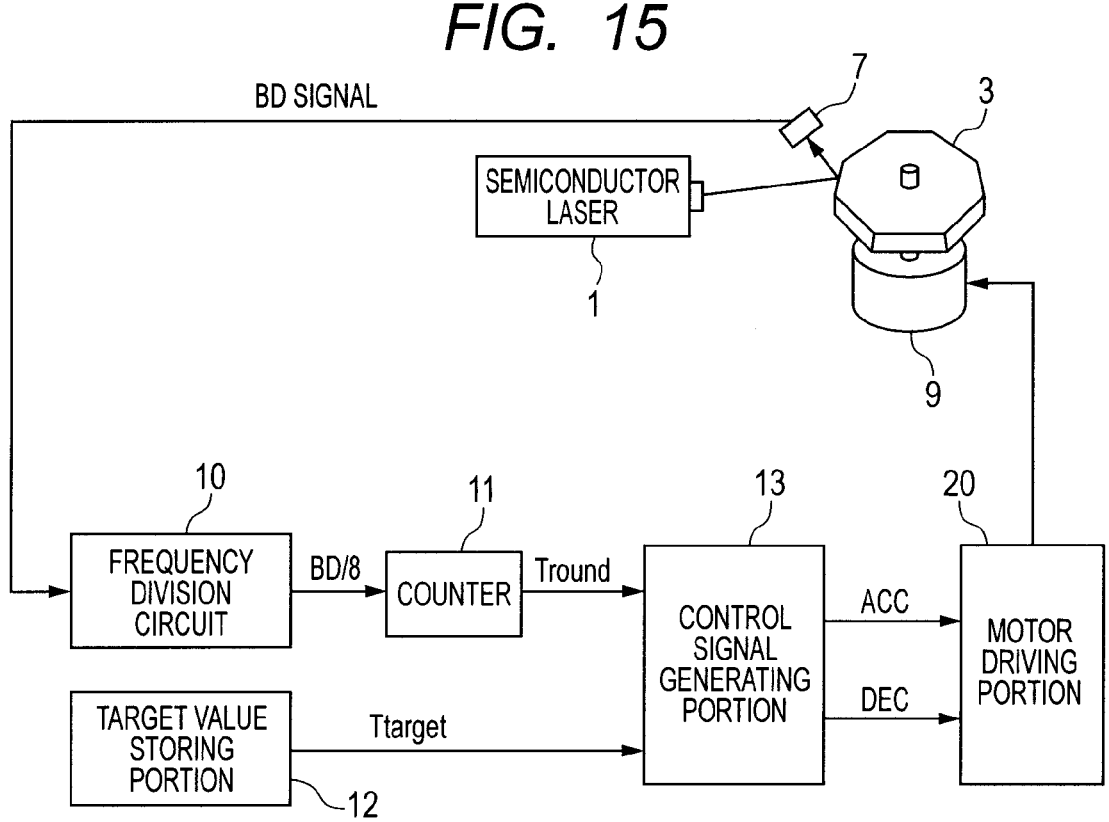
FIG. 15 is a block diagram of a control circuit.
Figure 16:
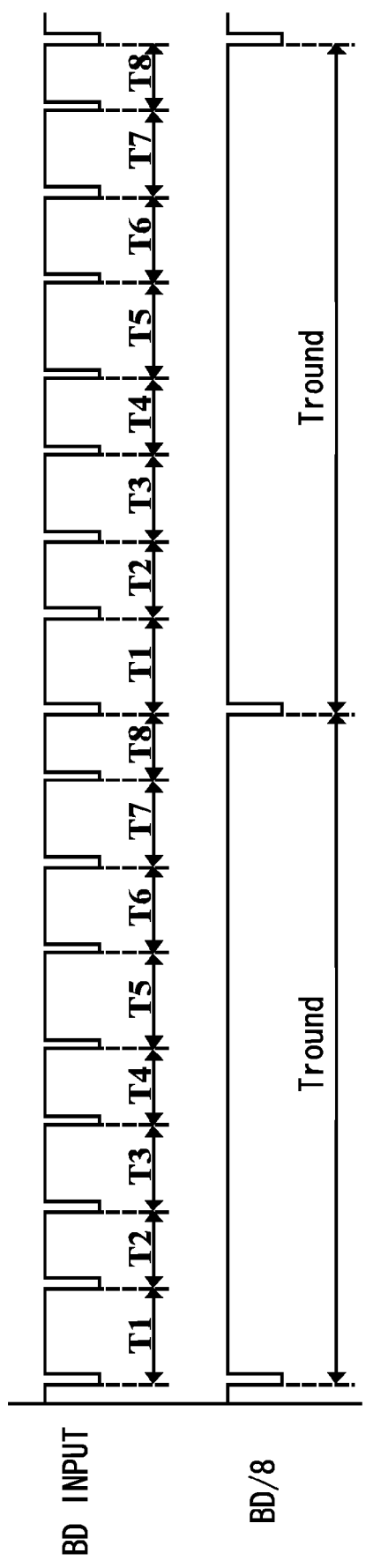
FIG. 16 is a chart illustrating fluctuations in cycle of a BD signal.

Note that, in FIG. 2, parts which are functionally equivalent to those in the related art illustrated in FIG. 14 are denoted by the same reference symbols and description thereof is thus omitted.

Referring to FIG. 2, a first BD reflecting mirror 15 and a first BD sensor 16 are disposed outside an image region on a scanning start side. Further, a second BD reflecting mirror 17 and a second BD sensor 18 are disposed outside the image region on a scanning end side. By measuring a time interval between detection by the first BD sensor and detection by the second BD sensor in this way, scanning magnification of a laser beam can be measured.

Returning to FIG. 1, driving control of a driving motor 9 and driving control of a semiconductor laser (a light source) 1 will be described. FIG. 1 is a control block diagram according to the first embodiment, schematically adding the driving motor 9. The driving motor 9 rotates a rotary polygon mirror 3. An LD driving control portion (a light source driving unit) 31 turns on and off the semiconductor laser 1 according to image data and a pixel clock. The semiconductor laser 1 emits a laser beam to the rotating rotary polygon mirror 3. The rotary polygon mirror 3 deflects and scans the laser beam emitted from the semiconductor laser 1. The laser beam reflected by the rotary polygon mirror 3 enters the first BD sensor 16 and the second BD sensor 18.

Referring to FIG. 1, a BD_T signal as a first main scanning synchronization signal detected by the first BD sensor 16 is input to the LD driving control portion 31 configured to turn on and off the semiconductor laser 1 and to a frequency division circuit 10. The frequency of the BD_T signal is divided by the frequency division circuit 10 by the number ("8" in FIG. 1) of mirror surfaces of the rotary polygon mirror 3, to thereby generate a BD/8 signal. The BD/8 signal is input to a counter 11 to measure a rotary cycle Tround of the rotary polygon mirror 3.

The measured cycle Tround (a count value of the counter 11) and a target cycle Ttarget stored in a target value storing portion 12 are input to a control signal generating portion 13. The control signal generating portion 13 calculates an acceleration control amount and a deceleration control amount of the driving motor 9 based on the measured cycle Tround and the target cycle Ttarget, and generates an ACC signal (an acceleration signal) and a DEC signal (a deceleration signal). Note that, as the target cycle Ttarget, a target cycle corresponding to the BD/8 signal is set.

Figure 3:
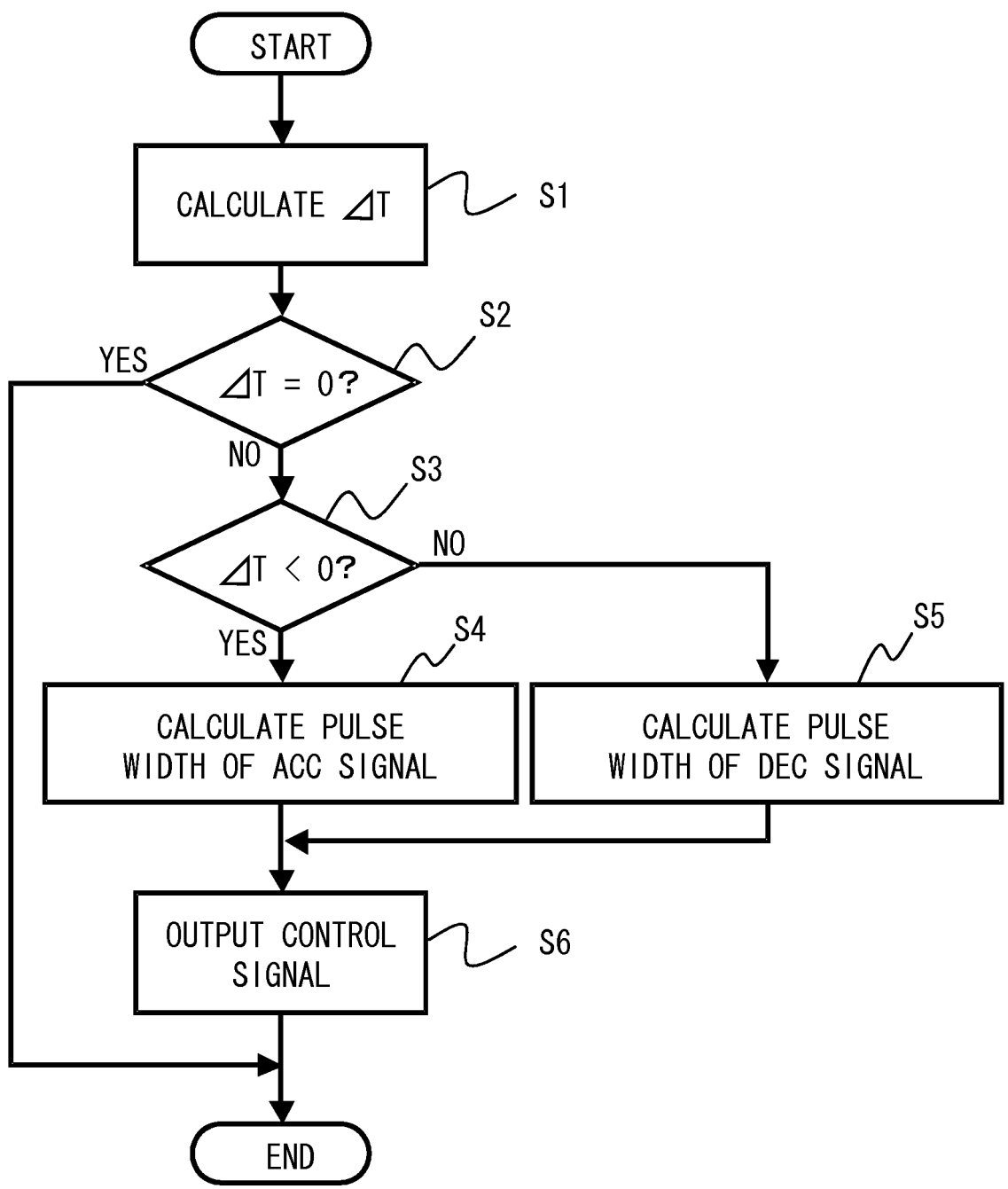
FIG. 3 is a flowchart illustrating an operation of a control signal generating portion.

FIG. 3 is a flowchart illustrating an operation of the control signal generating portion 13. The control signal generating portion 13 comprises a CPU (not shown) and a gate array (not shown). The control signal generating portion 13 starts its operation when the measured cycle Tround is updated. First, in Step S1, the control signal generating portion 13 calculates a difference ΔT (=Ttarget−Tround) between the measured cycle Tround and the target cycle Ttarget. The target cycle Ttarget is a target value stored in the target value storing portion 12.

In Step S2, the control signal generating portion 13 evaluates the value of the difference ΔT. For example, the control signal generating portion 13 determines whether the value of the difference ΔT is "0" or not. When ΔT is "0", it means that the rotary polygon mirror 3 is rotating at the target cycle Ttarget. Accordingly, when the difference ΔT is "0", the control signal generating portion 13 outputs motor control information indicating speed keeping control to the LD driving control portion 31, and ends the operation. The operation is restarted at the time of the next update of the measured cycle Tround. On the other hand, when the difference ΔT is not "0", the operation proceeds to Step S3.

In Step S3, the control signal generating portion 13 evaluates the value of the difference ΔT again. For example, the control signal generating portion 13 determines whether the difference ΔT is a negative value or not. When the difference ΔT is negative, it means that the measured cycle Tround is larger than the target cycle Ttarget, that is, the driving motor 9 is rotating at a speed lower than a target speed. Accordingly, in this case, the operation proceeds to Step S4.

In Step S4, the control signal generating portion 13 calculates a pulse width of the ACC signal, which is a time period for making the ACC signal active. The pulse width of the ACC signal is calculated according to, for example, Expression (1).

$$\text{ACC\_PW}' = \alpha_{ACC} \cdot \Delta T + \beta_{ACC} \quad (1)$$

In this expression, $\alpha_{ACC}$ and $\beta_{ACC}$ are constants related to the characteristics of the driving motor 9 and the characteristics of a motor driving portion 20. In addition, ACC_PW' calculated in Expression (1) is rounded to the control resolution to calculate a pulse width of the ACC signal. In this example, the control resolution is set to 50 nsec, and the pulse width of the ACC signal is determined as the integral multiple of 50 nsec. Note that, in Step S4, a pulse width of the DEC signal is determined as "0".

On the other hand, when the difference ΔT is determined as a positive value in Step S3, the operation proceeds to Step S5. When the difference ΔT is a positive value, it means that the measured cycle Tround is smaller than the target cycle Ttarget, that is, the driving motor 9 is rotating at a higher speed than the target speed. Accordingly, in Step S5, the control signal generating portion 13 calculates a pulse width of the DEC signal, which is a time period for making the DEC signal active. The pulse width of the DEC signal is calculated according to, for example, Expression (2).

$$\text{DEC\_PW}' = \alpha_{DEC} \cdot \Delta T + \beta_{DEC} \quad (2)$$

In this expression, $\alpha_{DEC}$ and $\beta_{DEC}$ are constants related to the characteristics (control response characteristics) of the driving motor and the characteristics of the motor driving portion 20. In addition, similarly to the ACC signal in Step S4, DEC_PW' is rounded to the control resolution to calculate a pulse width of the DEC signal. Note that, in Step S5, the pulse width of the ACC signal is determined as "0".

In Step S6, the control signal generating portion 13 makes active the ACC signal or the DEC signal for the pulse width calculated in Step S4 or Step S5. In this way, the control signal generating portion 13 calculates the pulse widths of the ACC signal and the DEC signal based on the target cycle Ttarget stored in the target value storing portion 12 and the measured cycle Tround, and outputs the calculated pulse widths.

When outputting the calculated pulse width (acceleration control amount) of the ACC signal and the pulse width of "0" of the DEC signal, the control signal generating portion 13 outputs motor control information indicating acceleration control to the LD driving control portion 31. Further, when outputting the calculated pulse width (deceleration control amount) of the DEC signal and the pulse width of "0" of the ACC signal, the control signal generating portion 13 outputs motor control information indicating deceleration control to the LD driving control portion 31. The motor control information also contains information on a lapsed time since the acceleration control or the deceleration control was started.

Note that, the calculations on the pulse widths of the ACC signal and the DEC signal performed by the control signal generating portion 13 may use other calculating expressions than Expression (1) and Expression (2) given above. Alternatively, the pulse widths of the ACC signal and the DEC signal may be determined by calculating the difference $\Delta T$ by a subtractor and referring to a lookup table with the difference $\Delta T$ as an input.

The ACC signal and the DEC signal generated by the control signal generating portion 13 through the above-mentioned operation are input to the motor driving portion 20. The motor driving portion 20 includes constant current sources 21 and 22, switching elements 23 and 24, a charge pump capacitor 25, an amplifier 26, and a motor driver 27.

The constant current sources 21 and 22 and the switching elements 23 and 24 together form a charge/discharge circuit of the charge pump capacitor 25. When the ACC signal, which is a low active signal, becomes "Low", the switching element 23 is turned on to charge the electric charges into the charge pump capacitor 25 via the constant current source 21. On the other hand, when the DEC signal, which is a low active signal, becomes "Low", the switching element 24 is turned on to discharge the electric charges from the charge pump capacitor 25 via the constant current source 22. Therefore, a voltage of the charge pump capacitor 25 increases and decreases within the range of the level of "Low" of the ACC signal to the level of "Low" of the DEC signal. The voltage is transmitted to the motor driver 27 via the amplifier 26 provided at the subsequent stage. Further, when the ACC signal is "High" and the DEC signal is "High", the switching elements 23 and are turned off and the voltage of the charge pump capacitor 25 is maintained. In other words, the control signal generating portion 13 outputs a control signal obtained by a combination of "Low" of the ACC signal and "High" of the DEC signal in order to accelerate the rotary speed of the motor, outputs a control signal obtained by a combination of "High" of the ACC signal and "Low" of the DEC signal in order to decelerate the rotary speed of the motor, and outputs a control signal obtained by a combination of "High" of the ACC signal and "High" of the DEC signal in order to maintain the rotary speed of the motor.

FIGS. 4 and 5 are graphs illustrating a basic operation of the motor driver 27. A solid waveform on the upper side of FIG. 4 is a triangular waveform generated inside the motor driver 27. The broken line indicates a voltage value transmitted from the amplifier 26. The voltage value is used as a threshold voltage. The motor driver 27 compares the triangular signal to the threshold voltage indicated by the broken line, and supplies electric power to the driving motor 9 for a time period during which the triangular signal falls below the threshold voltage. The supply of electric power to the driving motor 9 is therefore represented by a waveform illustrated on the lower side of FIG. 4.

A threshold voltage of FIG. 5 is lower than the threshold voltage of FIG. 4. Accordingly, as represented by a waveform on the lower side of FIG. 5, a time period during which electric power is supplied to the driving motor 9 is shorter than that of FIG. 4. Therefore, in the case of FIG. 4, a supplied amount of electric power to the driving motor 9 is larger than that of the case of FIG. 5 and the driving motor 9 thus rotates faster.

In this way, the motor driver 27 supplies electric power to the driving motor 9 based on pulse width modulation control. In other words, the rotary speed of the driving motor 9 varies according to the voltage value transmitted from the amplifier 26.

As described above, a motor driving control portion 30 controls the driving motor so as to rotate at a constant speed in a given range.

The BD_T signal as the first main scanning synchronization signal, a BD_E signal as a second main scanning synchronization signal, the motor control information, and an image signal are input to the LD driving control portion 31 of FIG. 1, thereby generating an LD driving signal as a driving signal of the semiconductor laser 1.

Figure 6:
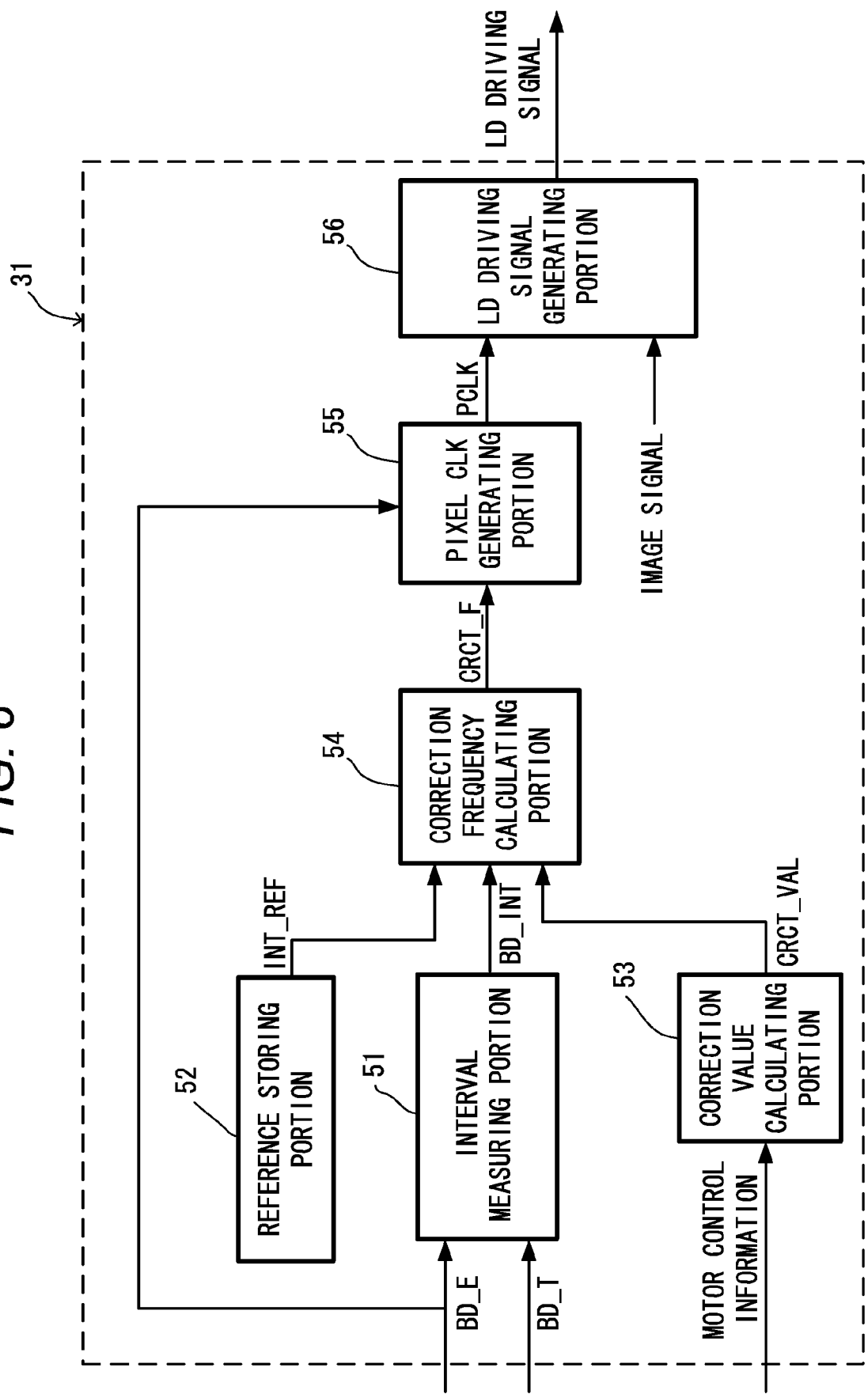
FIG. 6 is a block diagram of an LD driving control portion according to the first embodiment.

FIG. 6 is a block diagram of the LD driving control portion 31. The LD driving control portion 31 uses the motor control information generated in the motor driving control portion 30 to correct the frequency of the pixel clock. The motor control information indicates the control state of the rotary speed of the driving motor 9, which is any one of the acceleration control, the deceleration control, and the speed keeping control. Under the acceleration control, the LD driving control portion 31 increases the frequency of the pixel clock to correct the position of an image (an electrostatic latent image) to be formed on the photosensitive drum (a photosensitive member). Under the deceleration control, the LD driving control portion 31 decreases the frequency of the pixel clock to correct the position of an image to be formed on the photosensitive drum. Under the speed keeping control, the LD driving control portion 31 keeps the frequency of the pixel clock without any change.

The BD_T signal and the BD_E signal are input to an interval measuring portion 51. The interval measuring portion 51, which includes a counter circuit, measures a time interval between the BD_T signal and the BD_E signal and outputs a BD_INT signal as the measured value.

The BD_INT signal is input to a correction frequency calculating portion 54.

The motor control information, on the other hand, which is output from the motor driving control portion (a control unit) 30, is input to a correction value calculating portion 53. Here, the motor control information is information on control of the rotary speed of the driving motor 9. The motor control information contains the control state of any one of the acceleration control, the deceleration control, and the speed keeping control, the acceleration control amount or the deceleration control amount, and information on the lapsed time since the acceleration control or the deceleration control was started. Specifically, the motor control information is information indicating by how many control units the ACC signal or the DEC signal was output before how many scannings (in this example, the control resolution is 50 nsec and 50 nsec is thus a control unit). For example, the motor control information is information indicating that the ACC signal was output by one control unit (50 nsec) before one scanning.

The correction value calculating portion 53 calculates a correction amount of the frequency of a pixel CLK (a pixel clock) based on the input motor control information, and outputs the calculated correction amount to the correction frequency calculating portion 54 as a CRCT_VAL signal. The motor control information contains the pulse width of the ACC signal (acceleration control amount) or the pulse width of the DEC signal (deceleration control amount) calculated by the control signal generating portion 13. As the acceleration control amount increases, the frequency of the pixel CLK is corrected by a larger correction amount. In other words, as the acceleration control amount increases, the frequency of the pixel CLK is set higher. As the deceleration control amount increases, the frequency of the pixel CLK is corrected by a larger correction amount. In other words, as the deceleration control amount increases, the frequency of the pixel CLK is set lower.

An INT_REF signal is also input to the correction frequency calculating portion 54. The INT_REF signal is a reference value of the time interval between the BD_T signal and the BD_E signal stored in a reference storing portion 52.

The correction frequency calculating portion 54 determines the frequency of the pixel CLK based on the above-mentioned three input signals and outputs the determined frequency as a CRCT_F signal to a pixel CLK generating portion 55. When the BD_INT signal is larger than the INT_REF signal, which means the scanning speed of the laser beam is slower than a reference speed, the calculated frequency of the pixel CLK is lower than a reference frequency. When the motor control information indicates that, for example, the ACC signal was output by one control unit before one scanning, the scanning speed of the laser beam is expected to be faster in the next scanning. The frequency of the pixel CLK to be calculated is therefore set to be higher than that set when the ACC signal has not been output.

In other words, the LD driving control portion 31 determines the frequency of the pixel clock by using the information on the lapsed time since the acceleration control or the deceleration control was started (e.g., information as to how many scannings were performed after the acceleration control or the deceleration control), which is indicated by the motor control information, and a control response characteristic of the driving motor 9.

The pixel CLK generating portion 55 generates and outputs a PCLK signal which is a pixel CLK signal having a frequency corresponding to the input CRCT_F signal. The BD_E signal is also input to the pixel CLK generating portion 55, thus enabling the frequency of the pixel CLK to be corrected for each scanning by switching the frequency of the pixel CLK after the BD_E signal is detected.

When the motor control information indicates acceleration control, the LD driving control portion 31 corrects the frequency of the pixel clock so as to be higher than the frequency of the pixel clock, which is generated before the motor driving control portion 30 controls the driving motor 9 based on the motor control information indicating the acceleration control. When the motor control information indicates deceleration control, the LD driving control portion 31 corrects the frequency of the pixel clock so as to be lower than the frequency of the pixel clock, which is generated before the motor driving control portion 30 controls the driving motor 9 based on the motor control information indicating the deceleration control. When the motor control information indicates speed keeping control, the LD driving control portion 31 keeps the frequency of the pixel clock, which is before the speed keeping control is performed, without any change.

An LD driving signal generating portion 56 generates an LD driving signal based on the input PCLK signal and an input image signal.

Figure 7:
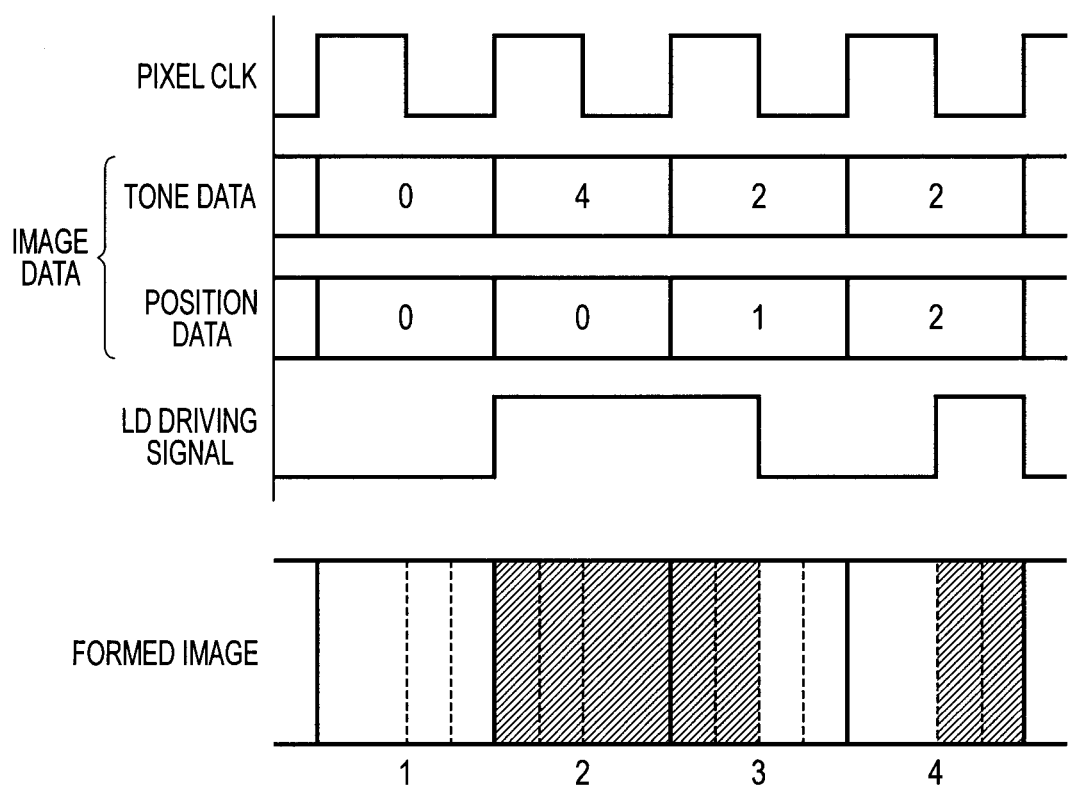
FIG. 7 is a timing chart illustrating an LD driving signal.

FIG. 7 is a timing chart illustrating how the LD driving signal is generated, schematically adding a formed image.

FIG. 7 exemplifies that an image whose pixels each have five tones (including 0) may be formed.

The pixel CLK is a clock signal synchronized with a pixel.

Image data contains tone data and position data, and the image data is given to each pixel. The tone data is five-level data of 0 to 4, and when the tone data is n, the semiconductor laser emits a laser beam to a region of n/4 of the pixel. The position data is three-level data of 0 to 2, and when the position data is 0, 1, and 2, an image is formed at the center of the pixel, on the left side of the pixel, and on the right side of the pixel, respectively.

The LD driving signal is a signal for causing the semiconductor laser to emit a laser beam when being High.

In the formed image, which is additionally illustrated in FIG. 7, a solid rectangular region represents a pixel, and the boundary between rectangular regions is determined in synchronization with a rising edge of the pixel CLK. Broken lines in a pixel define a quarter of one pixel (divided region) used for tone expression. A hatched region in a pixel represents a region in which an electrostatic latent image is to be formed by emission of the semiconductor laser. Note that, the number given below a pixel is used for description as the number of the pixel for convenience sake.

In FIG. 7, the first pixel is given the tone data of "0", and hence the semiconductor laser is not caused to emit a laser beam. The LD driving signal thus remains Low. The second pixel is given the tone data of "4", and hence the semiconductor laser is caused to emit a laser beam to a region of 4/4 of the pixel, that is, all the regions of the pixel. In the regions of the second pixel, the LD driving signal is thus set to High. The third pixel is given the tone data of "2" and the position data of "1", and hence the LD driving signal is generated so that the semiconductor laser may be caused to emit a laser beam to regions of 2/4 on the left-hand side of the pixel. Similarly, in the fourth pixel, the LD driving signal is generated so that the semiconductor laser may be caused to emit a laser beam to regions of 2/4 on the right-hand side of the pixel.

In this way, the semiconductor laser is caused to emit a laser beam in synchronization with the pixel CLK to form an image. When the scanning speed of a laser beam fluctuates, if the pixel CLK is kept at a fixed frequency, the position of an image also fluctuates. To address this, the pixel CLK is corrected so as to correct the fluctuations in scanning speed to prevent misregistration of an image.

According to the embodiment described above, the frequency of the pixel CLK is corrected based on the driving motor control information. This correction enables suppression of fluctuations in scanning magnification in association with acceleration or deceleration of the driving motor during image formation, thus achieving high quality image formation.

Second Embodiment

Figure 8:
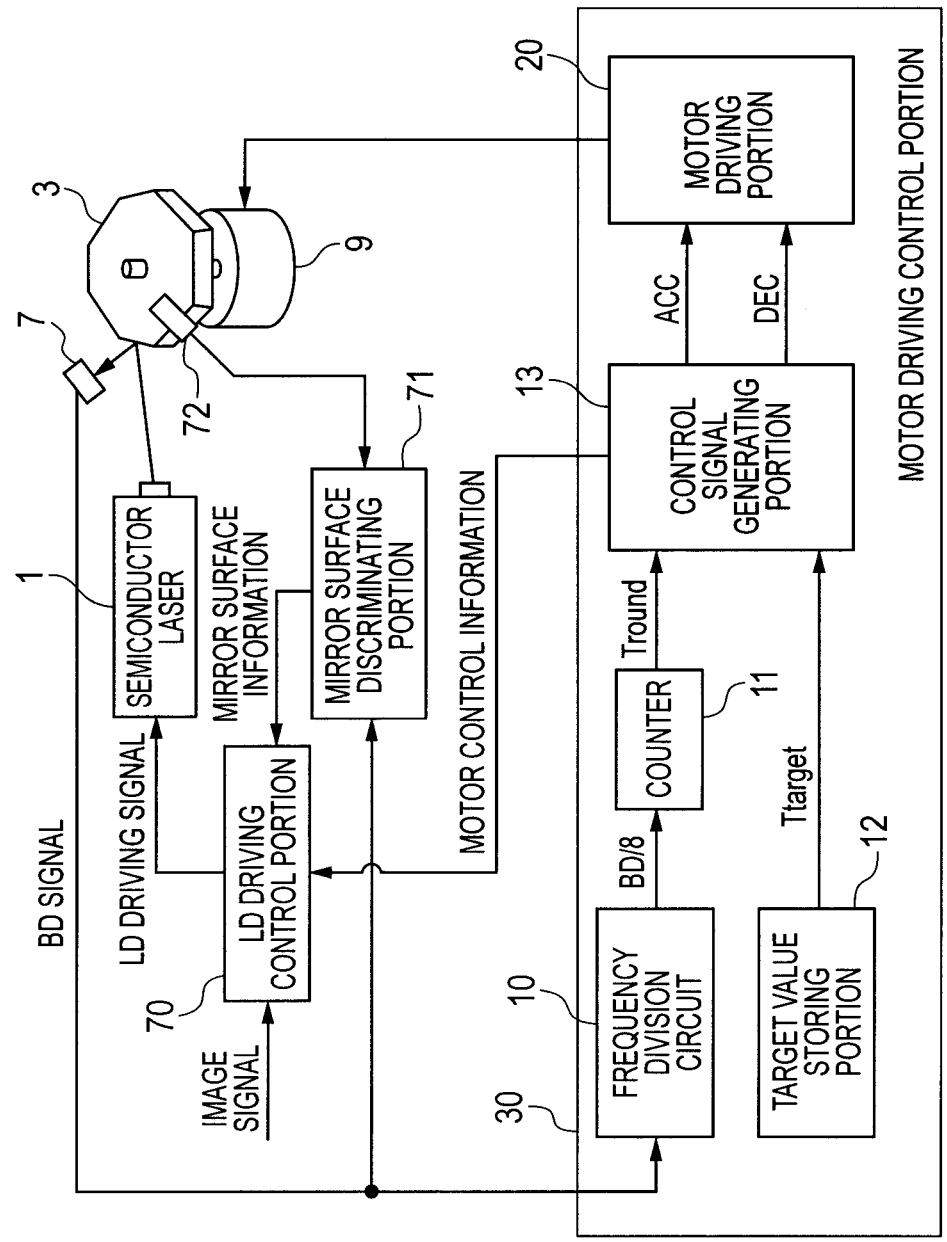
FIG. 8 is a block diagram of a driving motor and a semiconductor laser control circuit provided in a light scanning apparatus according to a second embodiment of the present invention.

FIG. 8 is a control block diagram according to a second embodiment of the present invention, schematically adding the driving motor 9 and the like. Note that, the structure of the laser beam scanning system is the same as that in the related art illustrated in FIG. 14 and description thereof is thus omitted. Further, parts which are similar to those in the first embodiment such as the motor driving control portion 30 are not described repeatedly.

Figure 9:
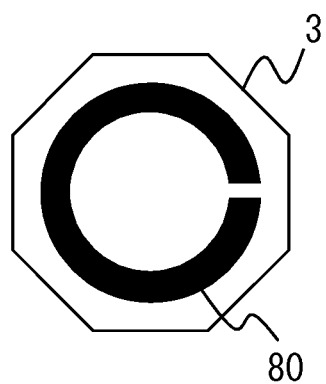
FIG. 9 is a top view of a rotary polygon mirror.
Figure 10:
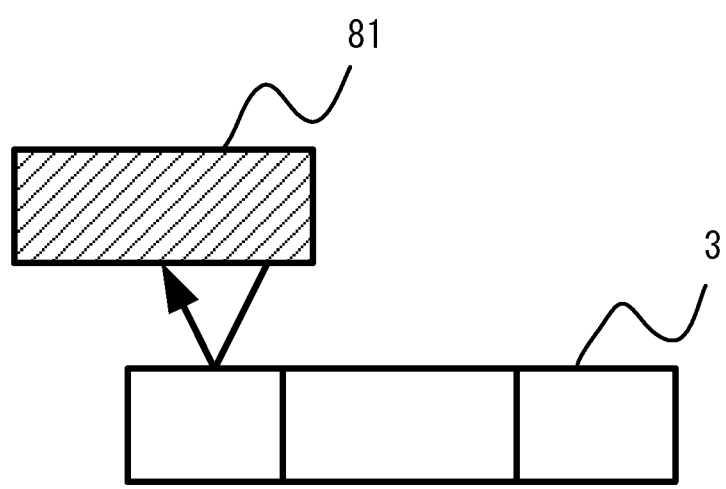
FIG. 10 is a side view of the rotary polygon mirror.

A reference mark detecting portion 72 detects a reference mark 80 (FIG. 9) of the rotary polygon mirror 3 for discriminating the mirror surface. FIG. 9 is a top view of the rotary polygon mirror 3. FIG. 10 is a side view of the rotary polygon mirror 3.

Referring to FIG. 9, on the top surface of the rotary polygon mirror 3, the reference mark 80 in which only a part of the circumference of the reflectance is different from other part of the circumference is formed. With the rotary polygon mirror 3 being rotated, an optical sensor 81 provided with a light emitting portion and a light receiving portion is used to detect the reference mark 80 as illustrated in FIG. 10, to thereby generate a pulse signal indicating a reference position once each revolution of the rotary polygon mirror 3. The reference mark detecting portion 72 includes the optical sensor 81. Note that, the positional relation between the reference mark 80 and the optical sensor 81 is adjusted such that a pulse signal may be output after the BD sensor 7 detects a laser beam deflected by the 8th surface and before the BD sensor 7 detects a laser beam deflected by the first surface.

A reference mark detecting signal generated by the reference mark detecting portion 72 is input to a mirror surface discriminating portion 71. At that time, a mirror surface that deflects a laser beam is discriminated by the mirror surface discriminating portion 71.

Figure 11:
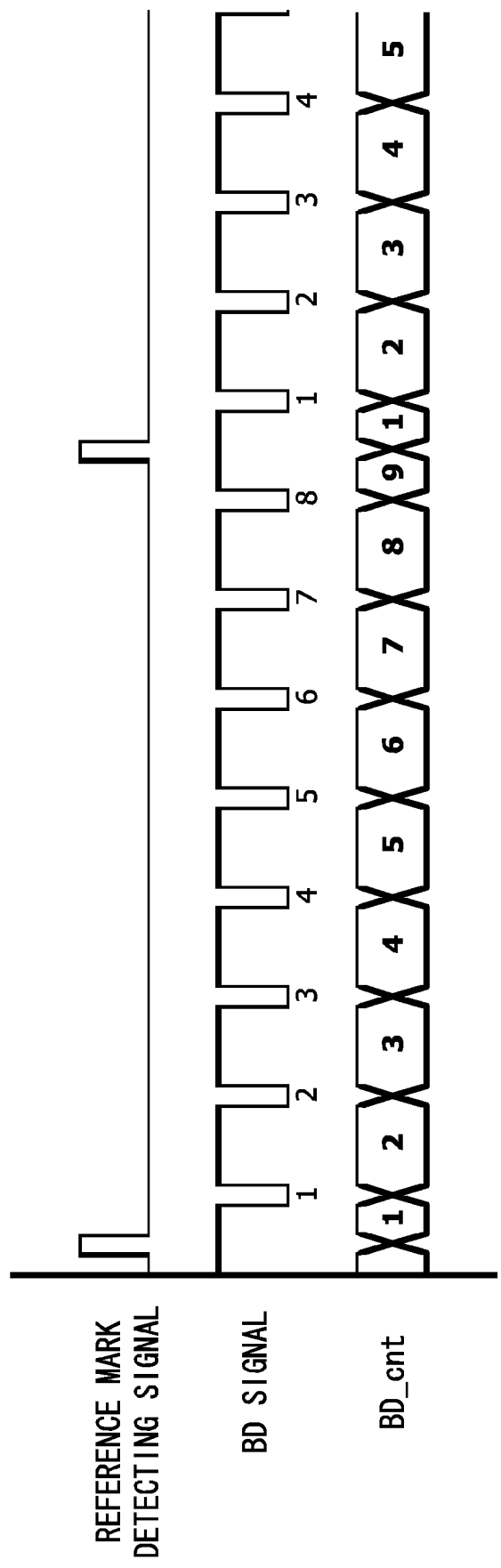
FIG. 11 is a timing chart illustrating an operation of a mirror surface discriminating portion.

FIG. 11 is a timing chart illustrating an operation of the mirror surface discriminating portion 71.

The reference mark detecting signal is a high active signal, and a pulse is therefore generated, as described above, after the BD sensor 7 detects the laser beam deflected by the 8th surface and before the BD sensor 7 detects the laser beam deflected by the first surface.

The BD signal is a low active signal, and a pulse is therefore generated each time the BD sensor 7 detects a laser beam deflected by the rotary polygon mirror 3. In FIG. 11, the number given below each pulse of the BD signal is for description, indicating the number of a mirror surface that is deflecting a laser beam. Specifically, a pulse given "1" is a pulse resulting from detection of a laser beam deflected by the first surface made by the BD sensor 7.

The mirror surface discriminating portion 71 includes a counter, and a BD_cnt signal of FIG. 11 is a count value thereof. The counter constituting the mirror surface discriminating portion 71 is set to "1" in synchronization with a rising edge of the reference mark detecting signal and is incremented in synchronization with a falling edge of the BD signal. Referencing the BD_cnt signal, which is a count value of the counter functioning in this way, enables the laser beam to be discriminated as to which mirror surface the laser beam is deflected by at the time when the pulse of the BD signal is generated.

The mirror surface discriminating portion 71 discriminates a mirror surface that is deflecting a laser beam in the way described above, and outputs the BD_cnt signal, which is a count value of the counter, as mirror surface information.

The mirror surface information generated by the mirror surface discriminating portion 71 is input to an LD driving control portion 70. The motor control information output from the motor driving control portion (control unit) 30 and an image signal are input to the LD driving control portion 70, thereby generating an LD driving signal as a driving signal of the semiconductor laser 1.

Figure 12:
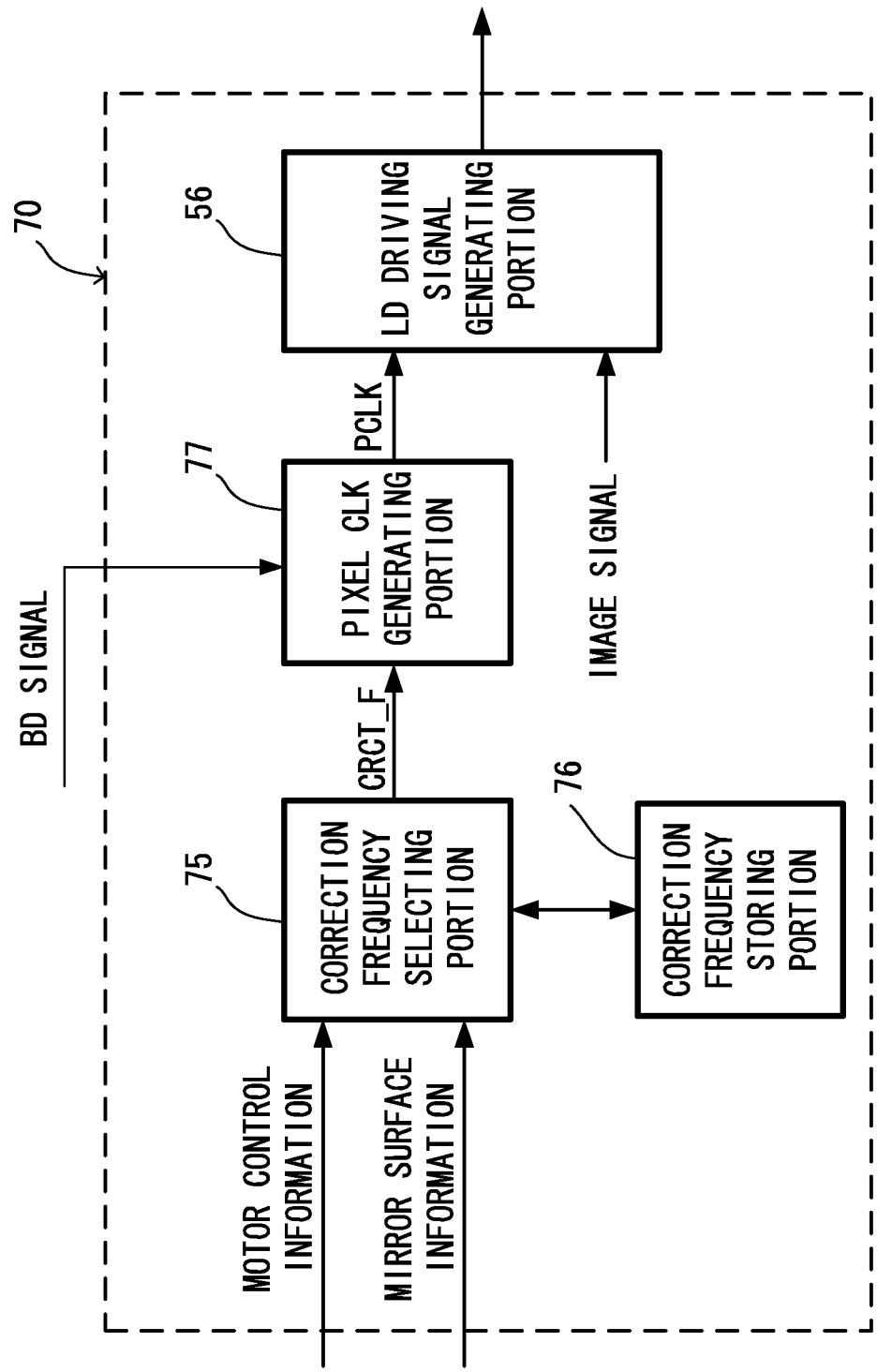
FIG. 12 is a block diagram of an LD driving control portion according to the second embodiment.

FIG. 12 is a block diagram of the LD driving control portion 70. The motor control information output from the motor driving control portion 30 and the mirror surface information output from the mirror surface discriminating portion 71 are input to a correction frequency selecting portion 75. The correction frequency selecting portion 75 reads out correction frequency information stored in a correction frequency storing portion 76 based on the two pieces of input information, and outputs the read correction frequency information as a CRCT_F signal to a subsequent stage.

Figure 13:
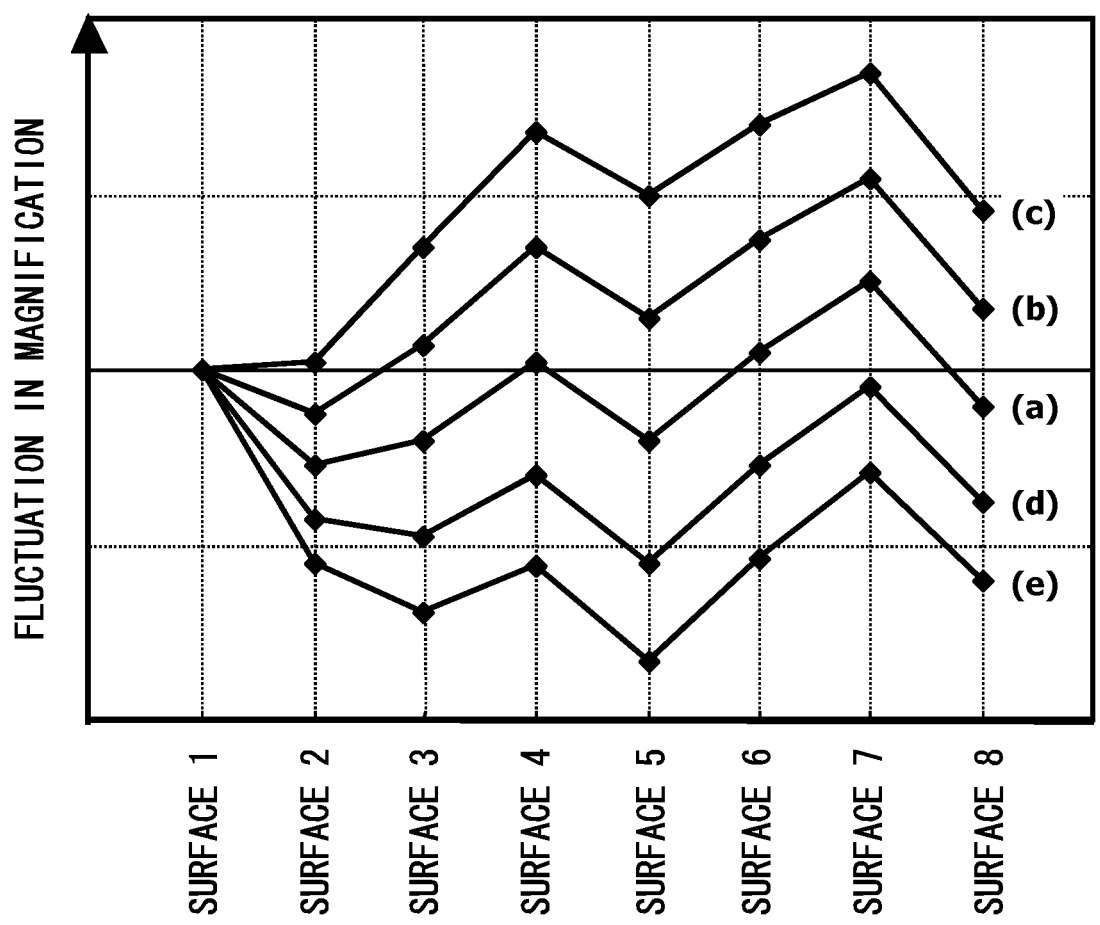
FIG. 13 is a graph illustrating an example of fluctuations in scanning magnification of a laser beam.

FIG. 13 is a graph illustrating fluctuations in scanning magnification depending on a mirror surface and a control state (the latest control state) of the driving motor 9. In FIG. 13, the vertical axis represents the scanning magnification and the horizontal axis represents the mirror surface number.

As described above, the speed control (rotary speed control) of the driving motor 9 is performed by detecting the speed every revolution of the rotary polygon mirror 3 and perform controls of acceleration (acceleration control), deceleration (deceleration control), and speed keeping (speed keeping control).

The plots (a) to (e) of FIG. 13 indicate scanning magnifications on the respective mirror surfaces for one revolution of the rotary polygon mirror 3 when acceleration, deceleration, and speed keeping are performed after the scanning by the mirror surface 1 is completed and before the scanning by the mirror surface 2. The plot (a) shows the case of speed keeping, the plot (b) shows the case of acceleration by one control unit (ACC output for 50 nsec), and the plot (c) shows the case of acceleration by two control units (ACC output for 100 nsec). The plot (d) shows the case of deceleration by one control unit (DEC output for 50 nsec), and the plot (e) shows the case of deceleration by two control units (DEC output for 100 nsec). Note that, the plots are average data on the scanning magnifications under the same control state of the driving motor 9.

As illustrated in FIG. 13, the scanning magnification fluctuates depending on the mirror surface involving the accuracy of the surface shape. Further, as can be seen from the plots (a) to (e), the scanning magnification fluctuates depending on the control state of the driving motor 9.

As described above, the scanning magnification fluctuates depending on the mirror surface and the control state of the driving motor. The correction frequency storing portion 76 of FIG. 12 stores the correction frequency information used for correcting a scanning magnification measured for each mirror surface and each control state of the driving motor 9. Based on the input mirror surface information and the motor control information, the correction frequency selecting portion 75 reads out the correction frequency information from the correction frequency storing portion 76, to thereby cancel the above-mentioned fluctuations in scanning magnification.

A pixel CLK generating portion 77 generates and outputs a PCLK signal which is a pixel CLK signal having a frequency corresponding to the input CRCT_F signal. The BD signal is also input to the pixel CLK generating portion 77, thus enabling the frequency of the pixel CLK to be corrected for each scanning by switching the frequency of the pixel CLK after a predetermined period of time has elapsed since the BD signal was detected.

The LD driving signal generating portion 56 generates an LD driving signal in the same way as in the first embodiment. Description thereof is omitted here.

As described above, in this embodiment, the frequency of the pixel CLK is corrected according to control information on the driving motor and information on a mirror surface that scans a laser beam. This correction enables suppression of fluctuations in scanning magnification for each mirror surface as well as fluctuations in scanning magnification occurring in association with acceleration or deceleration of the driving motor during image formation, thus achieving high quality image formation.

In the above-mentioned embodiments, the correction of the pixel CLK is performed by changing the frequency, but the present invention is not limited thereto. For example, the pixel CLK may contain a plurality of pulses per pixel so that a scanning magnification may be corrected by varying the number of pulses per pixel of the pixel CLK. The correction in this case only needs to vary the number of pulses while keeping a constant frequency of the pulse. When the motor control information indicates acceleration control, the LD driving control portion 31 corrects the number of pulses per pixel of the pixel CLK so as to be smaller than the number of pulses per pixel of the pixel CLK, which is generated before the motor driving control portion 30 controls the driving motor 9 based on the motor control information indicating the acceleration control. When the motor control information indicates deceleration control, the LD driving control portion 31 corrects the number of pulses per pixel of the pixel CLK so as to be larger than the number of pulses per pixel of the pixel CLK, which is generated before the motor driving control portion 30 controls the driving motor 9 based on the motor control information indicating the deceleration control. When the motor control information indicates speed keeping control, the LD driving control portion 31 keeps the number of pulses per pixel of the pixel CLK, which is before the speed keeping control is performed, without any change.

Note that, the scanning magnification may be corrected by varying the number of pulses of the pixel CLK for one scanning. Also in this case, when the motor control information indicates acceleration control, the LD driving control portion 31 corrects the number of pulses of the pixel CLK for one scanning so as to be smaller. When the motor control information indicates deceleration control, the LD driving control portion 31 corrects the number of pulses of the pixel CLK for one scanning so as to be larger. When the motor control information indicates speed keeping control, the LD driving control portion 31 keeps the number of pulses of the pixel CLK corresponding for one scanning, without any change.

Further, the present invention may also be embodied in a combination of the first embodiment and the second embodiment, and besides, various concepts including the broader, intermediate, and narrower concepts of the present invention as understood from the individual embodiments described herein may be embodied in various forms.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-175946, filed Aug. 5, 2010, which is hereby incorporated by reference herein in its entirety.

What is claimed is:

1. A light scanning apparatus, comprising:
    a light source configured to emit a light beam;
    a light source driving unit configured to turn on and off the light source according to image data and a pixel clock;
    a rotary polygon mirror configured to deflect the light beam emitted from the light source so that the light beam scans a photosensitive member;
    a motor configured to rotate the rotary polygon mirror; and
    a control unit configured to generate a signal, including an acceleration control signal and a deceleration control signal, for controlling a rotary speed of the rotary polygon mirror and control the motor based on the signal,
    wherein
    in a case in which the control unit generates the acceleration control signal, the light source driving unit corrects the frequency of the pixel clock so as to be higher than the frequency of the pixel clock, which is generated before the control unit controls the motor based on the acceleration control signal, and
    in a case in which the control unit generates the deceleration control signal, the light source driving unit corrects the frequency of the pixel clock so as to be lower than the frequency of the pixel clock, which is generated before the control unit controls the motor based on the deceleration control signal.

2. A light scanning apparatus according to claim 1, wherein the control unit generates a speed keeping signal in order to keep the rotary speed of the driving motor constant, and
    in a case in which the control unit generates the speed keeping signal, the light source driving unit keeps the frequency of the pixel clock, which is before the speed keeping control is performed.

3. A light scanning apparatus according to claim 1, wherein the acceleration control signal generated by the control unit contains an acceleration control amount and information on a lapsed time since the acceleration control is started, and
    the deceleration control signal generated by the control unit contains a deceleration control amount and information on a lapsed time since the deceleration control is started.

4. A light scanning apparatus according to claim 3, wherein in a case in which the control unit generates the acceleration control signal, the light source driving unit increases the frequency of the pixel clock more as the acceleration control amount is larger, and
    in a case in which the control unit generates the deceleration control signal, the light source driving unit decreases the frequency of the pixel clock more as the deceleration control amount is larger.

5. A light scanning apparatus according to claim 3, wherein the light source driving unit determines the frequency of the pixel clock based on one of the information on the lapsed time since the acceleration control was started according to the acceleration control signal and the information on the lapsed time since the deceleration control was started according to the deceleration control signal, and based on a control response characteristic of the motor.

6. A light scanning apparatus according to claim 1, wherein the light source driving unit corrects the frequency of the pixel clock every scanning.

7. An image forming apparatus, comprising:
    an image forming portion configured to form an image on a recording medium; and
    a light scanning apparatus according to claim 1.

8. A light scanning apparatus, comprising:
    a light source configured to emit a light beam;
    a light source driving unit configured to turn on and off the light source according to image data and a pixel clock, the pixel clock containing a plurality of pulses per pixel;
    a rotary polygon mirror configured to deflect the light beam emitted from the light source so that the light beam scans a photosensitive member;
    a motor configured to rotate the rotary polygon mirror; and
    a control unit configured to generate a signal, including an acceleration control signal and a deceleration control signal, for controlling a rotary speed of the rotary polygon mirror and control the motor based on the signal, wherein
in case in which the control unit generates the acceleration control signal, the light source driving unit corrects the number of pulses per pixel of the pixel clock so as to be smaller than the number of pulses per pixel of the pixel clock, which is generated before the control unit controls the motor based on the acceleration control signal, and in case in which the control unit generates the deceleration control signal, the light source driving unit corrects the number of pulses per pixel of the pixel clock so as to be larger than the number of pulses per pixel of the pixel clock, which is generated before the control unit controls the motor based on the deceleration control signal.

9. A light scanning apparatus according to claim 8, wherein the control unit generates a speed keeping signal in order to keep the rotary speed of the driving motor constant, and in a case in which the control unit generates the speed keeping signal, the light source driving unit keeps the number of pulses per pixel of the pixel clock, which is before the speed keeping control is performed.

10. A light scanning apparatus according to claim 8, wherein the acceleration control signal generated by the control unit contains an acceleration control amount and information on a lapsed time since the acceleration control is started, and the deceleration control signal generated by the control unit contains a deceleration control amount and information on a lapsed time since the deceleration control is started.

11. A light scanning apparatus according to claim 10, wherein in a case in which the control unit generates the acceleration control signal, the light source driving unit decreases the number of pulses per pixel of the pixel clock more as the acceleration control amount is larger, and in a case in which the control unit generates the deceleration control signal, the light source driving unit increases the number of pulses per pixel of the pixel clock more as the deceleration control amount is larger.

12. A light scanning apparatus according to claim 10, wherein the light source driving unit determines the number of pulses per pixel of the pixel clock based on one of the information on the lapsed time since the acceleration control is started according to the acceleration control signal and the information on the lapsed time since the deceleration control is started according to the deceleration control signal, and based on a control response characteristic of the motor.

13. A light scanning apparatus according to claim 8, wherein the light source driving unit corrects the number of pulses per pixel of the pixel clock every scanning.

14. An image forming apparatus, comprising:

an image forming portion configured to form an image on a recording medium; and a light scanning apparatus according to claim 8.

* * * * *